UNITED STATES PATENT OFFICE.

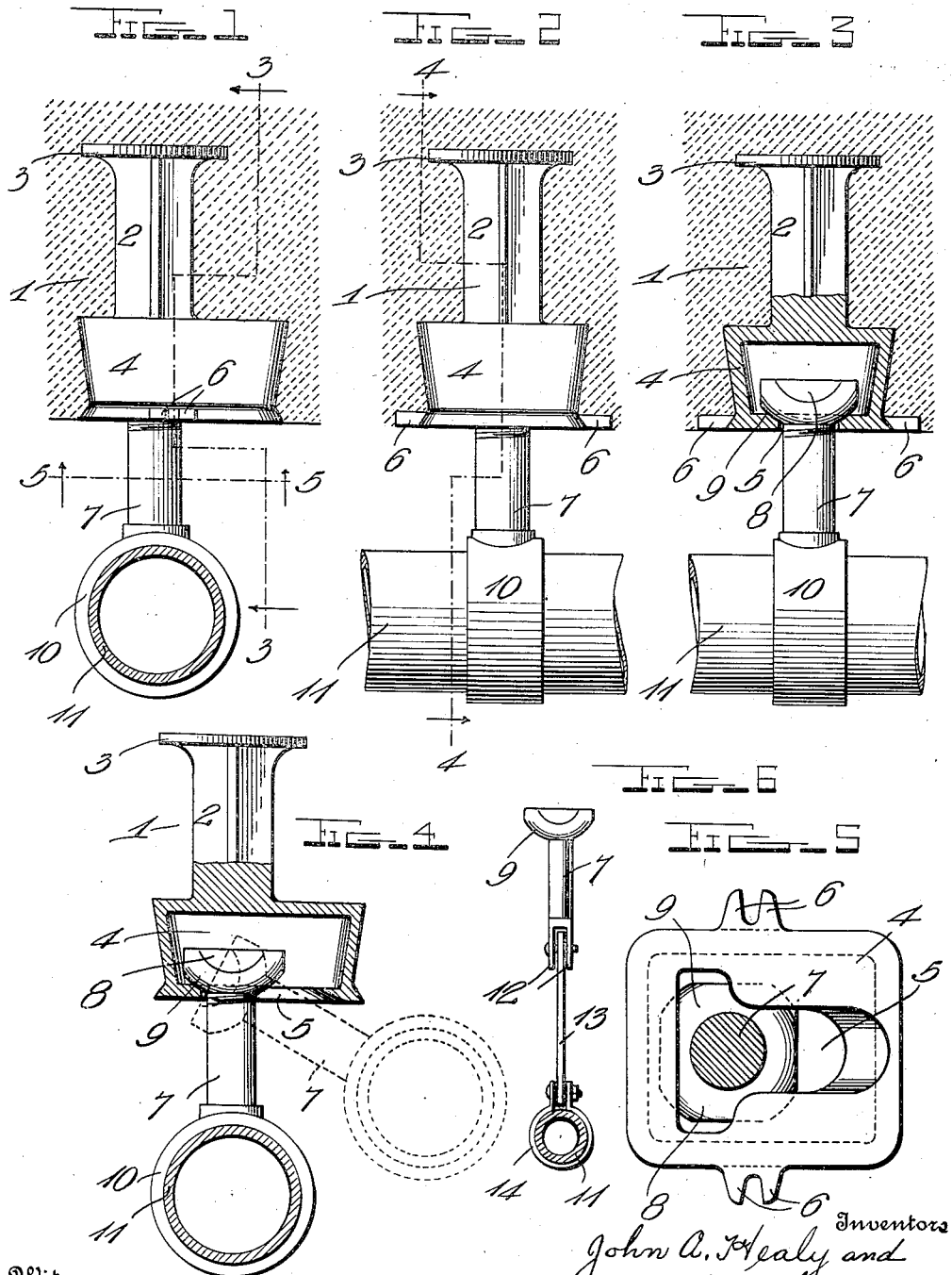

JOHN A. HEALY AND JAMES H. HEALY, OF ST. PAUL, MINNESOTA.

PIPE-HANGER.

1,049,085.  Specification of Letters Patent. Patented Dec. 31, 1912.

Application filed April 22, 1912. Serial No. 692,343.

*To all whom it may concern:*

Be it known that we, JOHN A. HEALY and JAMES H. HEALY, citizens of the United States, residing at 590 Ashland avenue and 130 Kent street, respectively, in the city of St. Paul, county of Ramsey, and State of Minnesota, have invented certain new and useful Improvements in Pipe-Hangers, of which the following is a specification.

This invention relates to pipe hangers, and has for its object to provide a hanger of simple structure which will effectually support a suspended rod, bolt or pipe and at the same time will permit a reasonable amount of relative movement between the rod, bolt or pipe and the fixed object from which it is suspended.

The hanger is especially adapted for use in suspending pipe or other objects from concrete or similar ceilings, and with this object in view the hanger consists of a member adapted to be embedded in the concrete ceiling and having a socket portion provided with a slot of peculiar configuration adapted to receive the head of a member which may be inserted therein. The first said member will be referred to throughout this specification as the fixed member and the last mentioned member as a movable member. The movable member may carry a ring through which the pipe is passed or the said member may be pivotally connected with the upper end of a bar which in turn may be provided with a ring through which the pipe is passed.

In the accompanying drawings:—Figure 1 is a side elevation of the pipe hanger embedded in a support; Fig. 2 is a similar view taken at a right angle to Fig. 1; Fig. 3 is a sectional view cut on the line 3—3 of Fig. 1; Fig. 4 is a sectional view cut on the line 4—4 of Fig. 2; Fig. 5 is a sectional view cut on the line 5—5 of Fig 1; and Fig. 6 is a detail view of a modified form of the pipe hanger.

Corresponding and like parts are referred to in the following description and indicated in all the views of the accompanying drawings by the same reference characters.

The pipe hanger includes a member 1 which is a casting provided with a shank 2 and a disk portion 3. The member 1 is also provided with a socket portion 4 which is provided in its lower side with a T shaped slot 5. The member 1 is adapted to be embedded in concrete which forms the ceiling of a building or other object and the said member is provided at the sides of its socketed portion 4 with spaced lugs 6 the lower surfaces of which are adapted to remain flush with the surface of the ceiling and in these lugs, nails, screws or bolts may be placed, whereby the member 1 is fastened to woodwork and thus supported in position at the ceiling of the structure until the concrete shall have set. The hanger also includes a member 7 which is provided with a head 8, tapped for pipe, bolt or rod, the said head being approximately square in transverse section with its under portion rounded as at 9. As shown in Fig. 1 of the drawing, the member 7 is provided at its lower end with a ring 10, tapped for pipe, bolt or rod through which a pipe indicated at 11 may be passed. As shown in Fig. 6 of the drawing, the member 7 is provided at its lower end with spaced ears 12. The upper end of a bar 13 is pivotally connected between the ears 12 and at the lower end portion of the said bar a ring 14 is connected through which the pipe 11 may be passed.

The slot 5 in the lower side of the socketed portion 4 of the member 1 is of such configuration and dimensions with relation to the head 8 of the member 7 that it is possible to slip the said head into the said socket only when the axis of the body portion of the member 7 is at an acute angle to the plane of the lower edge of the slot 5. Thus when the said head is inserted in the slot and the body portion of the member 7 hangs vertically or substantially at a right angle to the plane of the lower edge of the slot 5 it is impossible for the member 7 to become detached from the member 1. At the same time the member 7 at its lower portion will have a certain amount of swinging movement in any horizontal direction so that the pipe supported by the member 7 may be moved slightly without disconnecting the member 7 from the member 1. This is to allow for contraction and expansion of the pipe and also permits of moving the same during repairs or at the time of the installation of the pipe system. At the same time it permits that the member 1 may be embedded in the concrete approximately at its proper position and if it is embedded at a proper position and during the time that the concrete solidified should it move or assume a slightly slanting position it will still perform its function in effectually holding the member 7 in position when it is supporting a bolt, rod or pipe section. This is due to the fact that the slot 5 is T shaped in plan and the head 8 of the member 7 is approximately square with its under surface rounded and the said head 8 is greater in all of its transverse dimensions than the transverse breadth of the slot 5.

To disconnect the member 7 from the member 1 it is necessary to remove the pipe section 11 from the member 7, then swing the member 7 into such position that the head 8 of the said member may pass edgewise through the apertures of the T shaped slot 5 and in order to do this it is necessary to swing the body portion of the member 7 into the stem portion of the slot 5. Therefore the T shaped slot 5 by reason of its configuration plays an important part in combination with the parts of the pendent member 7 as shown and described.

The upper end of the member 7 is screw threaded and is tapped into the head 8. Therefore when it is desired to remove the member 7 from the head 8 without detaching the said head from the socket portion 4, a wedge may be inserted in the slot 5 which will hold the head 8 against rotation and then by applying a wrench to the rod 7 the said rod may be unscrewed from the head. In a similar manner the rod 7 may be assembled with the head 8.

Having thus described the invention, what is claimed as new is:

1. A hanger comprising a member provided with a socket portion having in its lower side a T-shaped slot which is completely inclosed between the vertical walls of the socket portion, said slot having all portions of the upper edges of the walls of the slot lying in the same plane, and a pendant member having a head approximately square with a rounded under side, said pendant member having means for supporting a pipe.

2. A pipe hanger comprising a member provided with a socketed portion having a T shaped slot, a pendent member having a head which is approximately square in transverse section and provided with a rounded under side, said head adapted to be received within the slot of the socketed member when the body portion of the pendent member is disposed at an acute angle to the plane of the edge of the slot, said socketed member adapted to retain the said pendent member when the axis of the body portion of the pendent member is approximately vertical with the plane of the slot, the parts being so proportioned that the pendent member may have slight swinging movement while confined with relation to the socketed member, and a ring carried by the pendent member for supporting a pipe section.

3. A pipe hanger comprising a member having a socketed portion provided with a T shaped slot, a pendent member having a head approximately square in transverse section and provided with a rounded under side, said head adapted to be slipped into the slot by edgewise movement through the apertures thereof, said pendent member having at its lower end spaced ears, a bar connected at one end between said ears, and a ring carried at the lower end of the bar and adapted to receive a pipe section.

In testimony whereof we affix our signatures in presence of two witnesses.

JOHN A. HEALY.
JAMES H. HEALY.

Witnesses:
M. GALLAGHER,
JAMES A. HECHTL.